United States Patent [19]

Frost et al.

[11] Patent Number: 5,203,504
[45] Date of Patent: Apr. 20, 1993

[54] PREPARING MIXED LIQUIDS

[75] Inventors: Andrew R. Frost, Stevington; John A. Marchant, Bedford, both of England

[73] Assignee: British Technology Group Limited, London, England

[21] Appl. No.: 801,594

[22] PCT Filed: Mar. 17, 1989

[86] PCT No.: PCT/GB89/00287
§ 371 Date: Sep. 13, 1990
§ 102(e) Date: Sep. 13, 1990

[87] PCT Pub. No.: WO89/08390
PCT Pub. Date: Sep. 21, 1989

Related U.S. Application Data

[63] Continuation of Ser. No. 573,149, Sep. 13, 1990, abandoned.

[30] Foreign Application Priority Data

Mar. 17, 1988 [GB] United Kingdom ............... 8806352

[51] Int. Cl.⁵ .................... A01M 7/00; A01C 23/04; B05B 7/32
[52] U.S. Cl. ................................ 239/10; 239/62; 239/308; 239/322; 239/323
[58] Field of Search ............ 239/10, 61, 62, 303–308, 239/310, 313, 321–323, 412

[56] References Cited

U.S. PATENT DOCUMENTS

| 2,323,618 | 7/1943 | Ottoson | 239/322 |
| 4,406,406 | 9/1983 | Knapp | 239/322 |
| 4,721,245 | 1/1988 | Van Zweeden | 239/10 |
| 4,858,830 | 8/1989 | Proctor et al. | 239/322 |
| 4,875,626 | 10/1989 | Buhler et al. | 239/322 |

FOREIGN PATENT DOCUMENTS

| 340716 | 12/1977 | Austria . | |
| 941944 | 4/1956 | Fed. Rep. of Germany . | |
| 1296950 | 5/1962 | France . | |
| 1422705 | 11/1965 | France . | |
| 2048091 | 12/1980 | United Kingdom | 239/62 |

Primary Examiner—Andres Kashnikow
Assistant Examiner—Karen B. Merritt
Attorney, Agent, or Firm—Cushman, Darby & Cushman

[57] ABSTRACT

A method of preparing a mixture of a carrier liquid and an active liquid in required proportion including: providing a flow of carrier liquid, controlling a liquid flow to an appropriate portion of the carrier liquid flow from pressure drop measurements of the proportional liquid flow, displacing active liquid with the proportional liquid flow without liquid contact, and including the displaced active liquid in the carrier liquid flow, thereby producing a liquid mixture in the required proportion without a flow meter. The mixed liquid may be used in at least one of a sprayer and a nutrient film equipment. The displacement medium may be provided from the carrier liquid supply.

20 Claims, 2 Drawing Sheets

PREPARING MIXED LIQUIDS

This is a continuation of application Ser. No. 07/573,149, filed on Sep. 13, 1990, now abandoned.

This invention relates to the mixing of liquids for agricultural purposes and more particularly to the preparation of spray liquids and nutrient solutions.

Liquids for agricultural purposes are often prepared by diluting a concentrate with water. Spray liquid is generally prepared by adding a small quantity of active ingredients in liquid form to a large quantity of carrier liquid, usually water, in a tank on the sprayer. It is important to produce a spray liquid which has the correct proportion of active ingredient so that the expected action, be it pesticidal, herbicidal or other, is obtained. Furthermore it is important to apply the correct quantity of spray liquid uniformly to a given area. All of the prepared spray liquid will usually be used in spraying but if spraying has to be interrupted or an error is made a quantity of spray liquid can remain and is not easily disposed of. For legal and environmental reasons the traditional technique of adding the active ingredient to a tank of water is thus no longer an acceptable one.

Proposals have been made for equipment which continuously adds the active ingredient to the carrier liquid as this is pumped to the spray head. In this way many of the problems of the traditional technique outlined above are in theory overcome. However the continuous addition of active ingredient is not easy. The active ingredient is often a very "aggressive" chemical, either itself or because of the solvent used, the mixing ratio required can vary over a wide range and the flow rate will have to vary with sprayer speed over the ground, while the carrier liquid can be at a high pressure, usually several bars.

Nutrient solutions are subject to similar requirements, the major one being generally the correct concentration.

Among proposals for continuous mixing are the use of diaphragm pumps driven at controlled speed to pump the active ingredient into a mixing device (Walsh Manufacturing company) and the use of a metering device driven by ground wheel to inject the active ingredient from a storage tank pressurised with compressed air (Terramatic). These proposals require pumps or like devices to handle the active ingredient, with all the problems this incurs.

SUMMARY OF THE INVENTION

It is an object of the invention to overcome the problems of preparing agricultural liquids by mixing.

According to the invention there is provided a method of preparing mixed liquids including: providing a supply of carrier liquid for utilisation, providing a supply of an active ingredient liquid for introduction into the carrier liquid in supply to the utilisation means, applying a displacement medium to displace the active liquid and introduce it into the carrier liquid, measuring and controlling the application of the displacement medium to produce a mixed liquid of specified proportions.

The controlling of the displacement medium may be open loop, that is to a set level, or closed loop, for example to maintain a required proportion in response to a sensor.

The utilisation means may include a sprayer or a nutrient film equipment.

The displacement medium may be carrier liquid from the supply. The volume of displacement medium applied may be controlled in accordance with control signals representing the demand for spray liquid when the utilisation means is a sprayer. The control signals may include at least one of required concentration of active ingredient, required spray liquid flow, sprayer size and speed over the crop.

According to the invention there is also provided a method of preparing a mixture of a carrier liquid and an active liquid in required proportion including: providing a flow of carrier liquid, controlling a liquid flow to an appropriate proportion of said carrier liquid flow from pressure drop measurements of the proportional liquid flow, displacing active liquid with said proportional liquid flow without liquid contact, including said displaced active liquid in said carrier liquid flow, thereby producing a liquid mixture in said required proportion without a flow meter.

According to the invention there is provided an apparatus to prepare a mixed liquid including means to supply pressurised carrier liquid along a path to utilisation means, means to contain a supply of active ingredient liquid, means to introduce active ingredient liquid from the container into the pressurised carrier liquid supply path, liquid isolating means operable to displace active ingredient liquid from the container for introduction into the carrier liquid supply path, means to supply a displacement medium to operate the means to displace active ingredient liquid and means to control said means to supply displacement medium having regard to pressure drop in said displacement medium supply means to produce a mixed liquid of specified properties for supply along said path to the utilisation means.

The displacement medium may be carrier liquid from the pressurised supply upstream of the means to introduce active ingredient liquid. The means to supply displacement medium may include a pump and associated pressure transducers of the pressure difference across the pump and a pump control means responsive to signals from the transducers. The pump for the displacement medium may be controlled in response to signals representing the operation of the utilisation means such as a sprayer or nutrient film equipment.

The signals may be processed in a calculating device, such as a dedicated microcomputer or like arrangement, in the pump control means to produce a pump control signal. The signals may include sprayer speed over the ground, sprayer boom size, required active ingredient concentration, spray liquid flow rate and the like.

The apparatus may be arranged so that the active ingredient liquid is contained until introduction into the carrier liquid. In this way spray liquid is produced only as required and the problem of waste spray liquid reduced if not eliminated. Furthermore any carrier liquid pump and displacement medium pump do not have to handle the active ingredient. The active ingredient is thus held isolated with minimum contact with anything else. The active ingredient may be drawn into the container by reversing the action of the displacement medium. No measurements of flow are required.

The apparatus may include flushing means operable on the completion of displacement of active ingredient liquid to supply a flushing liquid to the container and the introduction means. The flushing means, particularly when the displacement medium is the carrier liquid may be a valve operable to bypass the isolating displacement means on the displacement means reaching its furthest extent and allow carrier liquid to flush the container and introduction means. The liquid isolating means may be one of a piston and a diaphragm.

BRIEF DESCRIPTION OF THE DRAWINGS

Embodiments of the invention will now be described with reference to the accompanying drawings in which.

Figure 1:
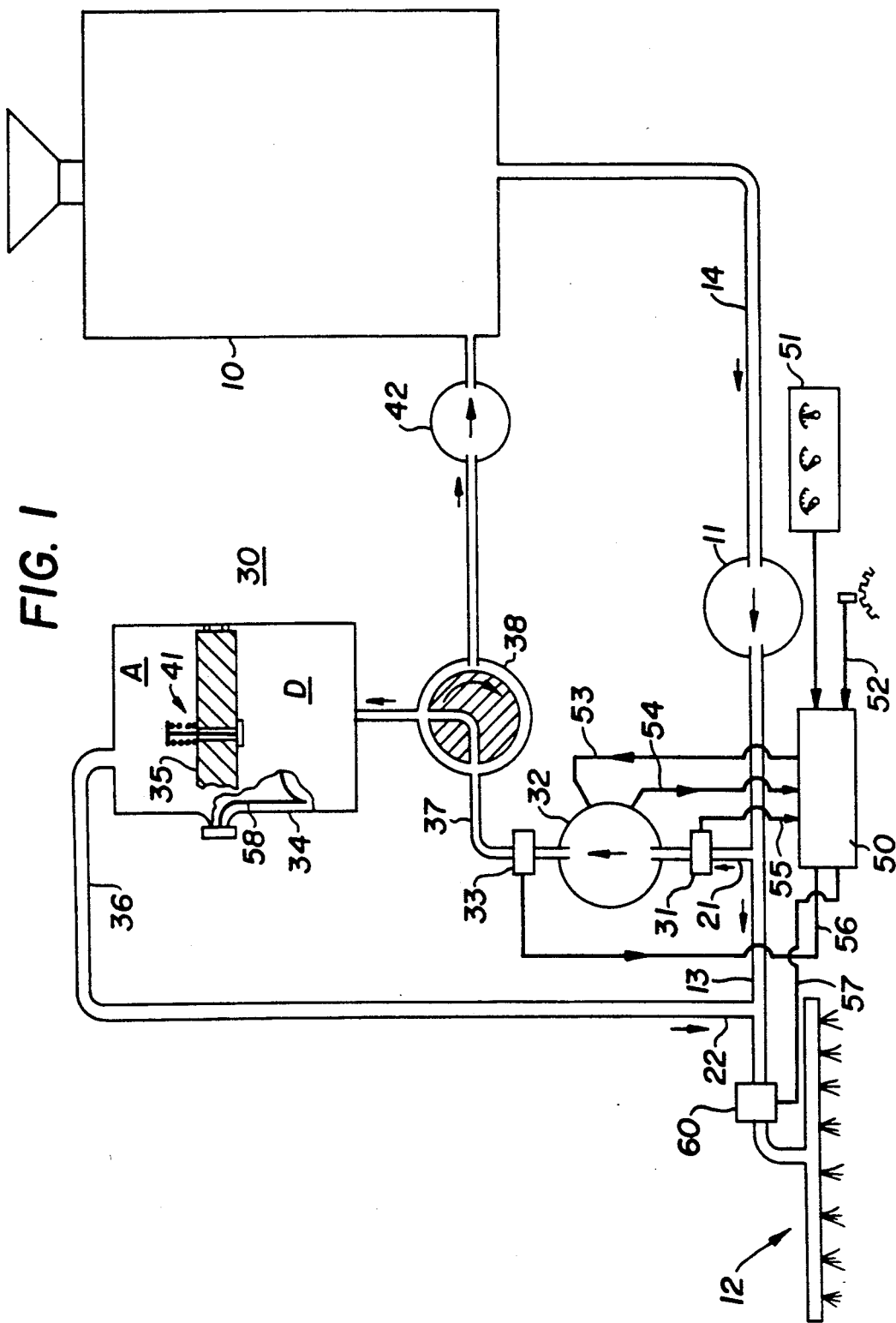
FIG. 1 shows in block schematic outline spray liquid preparation according to the invention, and

DETAILED DESCRIPTION OF THE INVENTION

FIG. 2 shows a graph useful in understanding the invention.

A carrier liquid tank 10 is connected by conduit 14 to a pump 11 which in turn supplies liquid at a suitable pressure over conduit 13 to spray boom 12. These devices are well-known in the art, in many forms, and need no further description. Similarly the methods of support are many and well-known. At 21 and 22 there are connections to conduit 13. Connection 21 permits pressurised carrier liquid to be drawn off and connection 22 permits active ingredient liquid to be introduced into the pressurised carrier liquid in supply to the spray boom to produce the spray liquid for dispersal as active spray.

Reference 30 indicates generally the items for causing the active ingredient to be introduced into the carrier liquid at connection 22. A conduit 37 extends from connection 21 to a pump 32 via a pressure transducer 31 and on from pump 32 via a further pressure transducer 33 and changeover valve 38 to an active ingredient liquid container 34. Container 34 is connected to connection 22 by conduit 36.

Container 34 is a piston-and-cylinder arrangement of two volumes. A and D, isolated from one another by free piston 35. Free piston 35 can move from one end to the other of container 34, enlarging one of the volumes and reducing the other. A diaphragm 58 may be used instead of the piston 35, as shown in FIG. 1.

In operation, in outline, piston 35 is positioned with volume A large and volume D small. Volume A contains active ingredient in liquid form. Tank 10 contains carrier liquid, usually water. When pump 11 is supplying pressurised carrier liquid from tank 10 to sprayboom 12 the pump 32 is controllably operated to supply pressurised carrier liquid over conduit 37, from connection 21, as displacement medium to displace piston 35 to reduce volume A and force active ingredient liquid via conduit 36 to connection 22 where it mixes with the carrier liquid to produce a required spray liquid for dispersion by spray boom 12. Of course the areas of the piston in each volume need not be the same.

The exact amount of displacement medium supplied by pump 32 is controlled by a calculating device such as microcomputer 50. Typically this receives signals 55 and 56 from transducers 31 and 33, which represent displacement medium pressure, signal 52 representing sprayer speed over the ground and signals from control unit 51 for boom size, active ingredient concentration and other parameters in accordance with an operator's requirements. In particular the transducer 31 indicates carrier liquid pressure which is related to flow rate and signal 55 can therefore be used to assist in the control of the displacement of active ingredient to maintain a required concentration in the spray liquid, or to vary the concentration to compensate for a variation in operation, say boom section in use or speed, which requires an alteration in the amount of active ingredient to maintain a specific dosage to the crop. Pump 32 includes a sensor to indicate speed as signal 54, and there is a control line 53 to regulate the operation of the pump. A suitable control and calculating device can be designed using the Zeigler and Nichols method (Applied Digital Control. J. R. Leigh, Prentice-Hall 1985) although other designs are of course possible. The controller is a proportional plus integral plus derivative type. The controller transfer function coefficient c is increased as far as possible to reduce the time to respond to a step input without incurring overshoot. When c reaches 1.75 V.s/ml a response to 90% of the instructed output is achieved in less than one second. For ramp inputs, which are more likely in practice, close following is achieved, with a delay of about 0.6 seconds to increase flow from zero to 10 ml/s in about 5 seconds. Some disturbance can arise from changes in the flow resistance of the system, such as a partial blockage of a pipe. It is found that fairly abrupt closing and reopening of a pipe, using a needle valve to represent a blockage, do not cause more than a brief disturbance in flow rate (less than ten percent for a second or two) as the pump speed rapidly adjusts to restore the required condition. The general accuracy and repeatability of the controller is better than 5% for a flow rate range of 10:1. Thus two systems in parallel should give the required 120:1 extreme range.

As in some cases three chemicals are used at once it would be appropriate to provide a triplicate system.

While it is possible to enhance the performance of the controller the length of pipe between the mixing junction 22 and the nozzles on boom 12 now becomes significant in terms of the response of the spray actually delivered from the nozzles. One way of shortening the response time is to deliver metered chemical to the individual nozzles. However the complexity of piping and the need for 40 equal deliveries, on a typical large boom. at some 0.02 ml/s are great obstacles. Also lots of piping would remain full of chemical at the end of spraying, negating an advantage of the invention.

However by providing a central mixing chamber, e.g. at mixing junction 22, and supplying the output to a group of nozzles improved response can be achieved without too much complexity. By experiment it has been found that a group of about ten nozzles, fed at the centre by a T-connector from a specific pipe to the mixing chamber, can reduce the response time to 2.5 to 3 seconds from the more usual 6 or 7 seconds at the same, conventional pressure and flow conditions.

One suitable pump for item 32 is made by the Tuthill Pump Company of California, Model B9049-MCQS. This is a gear pump giving semi-positive feeding of liquid and has a magnetic link between drive and impeller to permit liquid isolation without rotating seals and to allow slip on overload.

A diaphragm may be used instead of a piston provided accuracy is maintained.

This arrangement avoids the need for a flow meter to measure either the carrier liquid or ingredient liquid flow. Flow meters are relatively expensive, not very robust, devices. Also flowmeters have a limited range, generally 10:1 or 20:1 which is too small, as explained below. Instead of a flow meter the pump and two pressure transducers coupled with a calculating and control device provides a simple, robust and economic arrangement by which the volume of displacement medium is measured with adequate accuracy from knowledge of the pump characteristics, typically as shown in FIG. 2. Pressure sensors are readily available economic, reliable devices.
Figure 2:
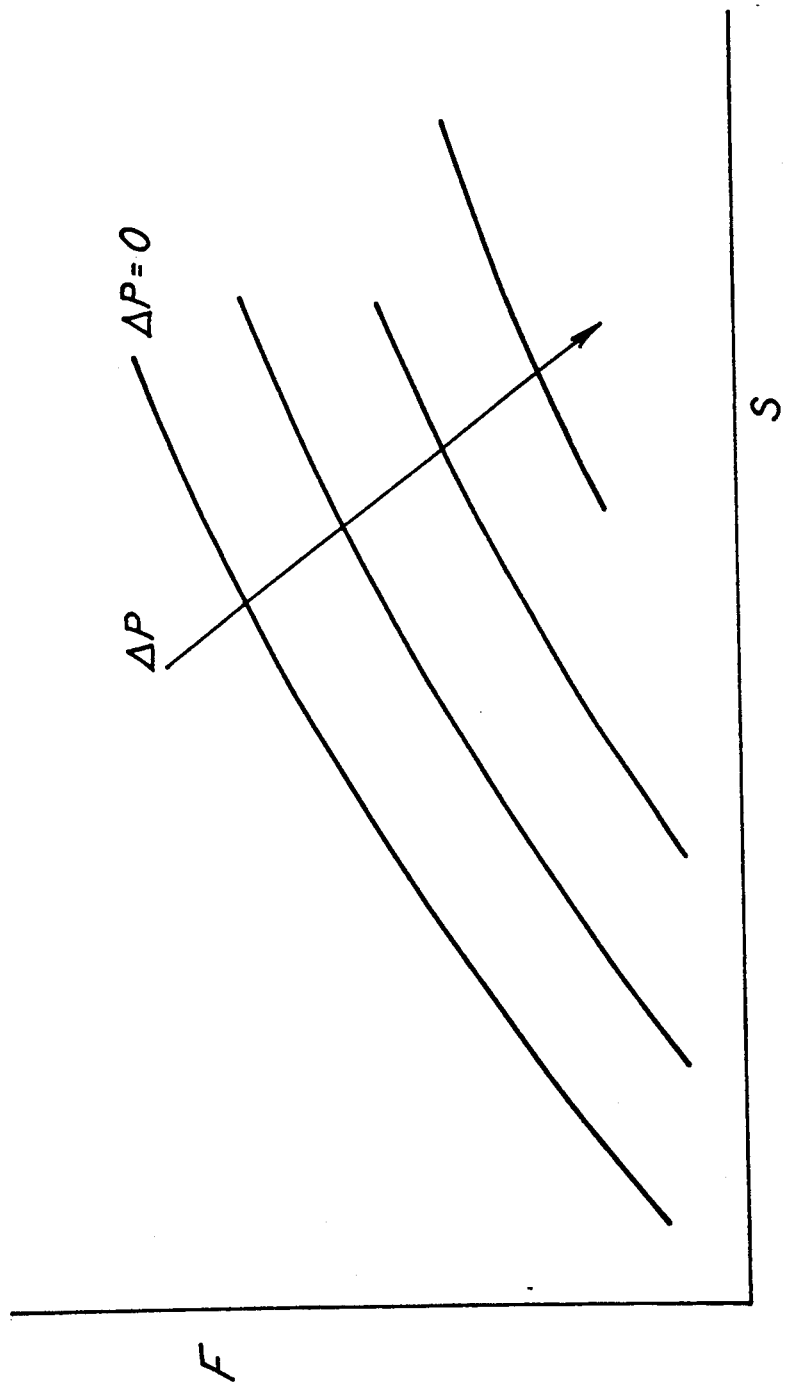
FIG. 2 shows that if pump speed (S) is controlled with reference to pressure differences across the pump ($\Delta P$) a required flow rate (F) is achievable. Accordingly a required supply rate of displacement medium can be achieved and, because the pump is small, rapid control is possible. The control regime can be provided by a microcomputer 50 which carries out calculations on the basis of the pump characteristics in a manner readily arranged by those skilled in the art. Flow rates between 1 milliliter/second (or less) and 15 milliliter/second are possible with speed variations of 400 to 2500 revolutions per minute and pressure differences of 0.1 bar to 1.0 bar, for the exemplary arrangement.

It is possible, and may be convenient, for the apparatus to be arranged to draw the active ingredient into container 34. To this end a change-over valve 38 is operable to connect volume D to the suction side of a pump 42. This pump extracts displacement medium from volume D and returns it to tank 10. This action can draw active ingredient into volume A through a suitable connection. Valves may be needed, in particular in conduit 36, to control this operation. If suitable connections and valves are provided it is possible to connect an unopened container of active ingredient to container 34 and draw some or all of its contents directly into volume A without opening the container. This reduces risk of contamination of the active ingredient and loss or spillage which could be harmful to the operator or the environment.

A valve 41 may be provided in piston 35 so that when volume A is emptied of active ingredient the displacement medium is allowed to enter volume A and conduit 36 to flush it clean of active ingredient.

The rapid control of active ingredient provided by the arrangement described enables "spot" spraying, i.e. the selective spraying of part only of an area of crop.

The constructional arrangements to apply the displacement technique described above to any particular sprayer will be readily apparent to those skilled in the art and will not be described further. It should however be noted that the "displacement" circuit operates at sprayer pressure, which is often several bars, and appropriate materials and construction are needed. The volume of the "displacement" circuit is much smaller than that of the carrier liquid circuit. Typically a carrier liquid tank is between 1000 and 4000 liters while an active ingredient volume of between one liter and 100 liters is typical. Spray rates may require active ingredient at between 0.5 liter/hectare and 5 liter/hectare. Accordingly, when allowance is made for different boom lengths the actual flow of active ingredient may have to be varied between 0.3 and 40 milliliters/second. Such a range is beyond one flowmeter, so several with suitable valves, etc. would be needed. Error is clearly possible with such an arrangement. The viscosity of the active ingredient is not always predictable as often suspensions are used. The active ingredient can include aggressive materials which would attack the actual flowmeter.

The technique permits the continuous mixing of a spray liquid to a required concentration with very rapid response to changes in requirement as the amount of liquid involved is small. Many of the problems associated with pre-mixing in a bulk tank are avoided as mixing takes place only when spray liquid is being dispersed. Many of the problems of earlier proposals for continuous mixing are overcome in that no pumps or flow meters are needed for the active ingredient liquid path. Accuracy is very good as there is a known relationship, which need not be 1:1, between the volume of displacement medium and the volume of active ingredient liquid. The use of a precision metering pump is also avoided, but a volumetric basis is used for measurement so the effects of viscosity change are reduced. The technique is also applicable to the mixing of nutrient solutions, for example those used in nutrient film culture, where continuous preparation to a possibly varying proportion is required. In such use the proportion may be controlled in a "closed loop" 57 including a sensor 60 responsive to the proportions of the mixed liquid.

We claim:

1. A method of preparing a mixture of a carrier liquid and an active liquid in required proportion including:

providing a flow of carrier liquid, providing a forced liquid flow of a proportion of said carrier liquid flow, providing a control member in a flow path of said proportional liquid flow, making pressure difference measurements of the forced proportional liquid flow at an inlet and outlet of said control member, an inlet pressure of said control member being independent of an outlet pressure thereof, controlling said proportional liquid flow to a selected required proportional of said carrier liquid flow from said pressure difference measurements, displacing active liquid with said proportional liquid flow without liquid contact, conveying said displaced active liquid freely to said carrier liquid flow, including said displaced active liquid in said carrier liquid flow, thereby producing a liquid mixture in said required proportion without a flow meter for said carrier or said active liquid.

2. A method of preparing mixed liquids including:

providing a supply of carrier liquid for utilization, providing a supply of an active ingredient liquid for introduction into the carrier liquid in supply to utilization means, pumping a supply of a displacement liquid to displace the active liquid without liquid contact and introducing the active liquid directly into the carrier liquid, determining carrier liquid pressure to determine a carrier liquid flow rate, measuring the amount of pumped displacement liquid and controlling said pumping with regard to said measurement and said carrier liquid flow rate to produce a mixture of active liquid with said carrier liquid of specified proportion.

3. A method according to claim 2 including controlling the amount of pumped displacement liquid in an open loop, thereby permitting a mixture of a set proportion.

4. A method according to claim 2 including controlling the amount of pumped displacement liquid in a closed loop to maintain said mixture of a required proportion in response to a sensor.

5. A method according to claim 2 in which the utilization means is at least one of a sprayer and a mechanism for dispensing nutrient solutions.

6. A method according to claim 2 including providing the displacement liquid from the carrier liquid supply.

7. A method according to claim 2 in which the utilization means is a sprayer and including controlling the volume of displacement liquid applied in accordance with control signals representing the demand for mixed liquid.

8. A method according to claim 7 in which the control signals include at least one of required concentration of active ingredient liquid, required mixed liquid flow, sprayer size and speed over the crop.

9. An apparatus to prepare a mixed liquid including:
means to supply pressurized carrier liquid along a path to utilization means,
means to contain a supply of active ingredient liquid,
an unrestricted flow path to introduce active ingredient liquid from the container means into the pressurized carrier liquid supply path,
liquid isolating means operable to displace active ingredient liquid from said container means for introduction into the carrier liquid supply path,
means to supply a displacement medium to operate the liquid isolating means to displace active ingredient liquid into the carrier liquid, and
means to control said means to supply displacement medium to produce a mixed liquid of specific properties for supply along said path to the utilization means,
the displacement medium supply means including a pump, the means to control the displacement medium supply including associated pressure transducers to detect the pressure difference across the pump and a pump control means responsive to the transducers and to pressure difference in said displacement medium supply means indicated thereby, an output pressure of said pump being independent from an input pressure of said pump.

10. An apparatus according to claim 9 in which the displacement medium is carrier liquid from the pressurized supply upstream of the unrestricted flow path.

11. An apparatus according to claim 9 in which the pump for the displacement medium is further controlled in response to signals representing the operation of the utilization means, said means being at least one of a sprayer and a mechanism for dispensing nutrient solutions.

12. An apparatus according to claim 11 in which said operation representing signals and outputs from said transducers are processed in a calculating device of a dedicated microcomputer in the pump control means to produce a pump control signal.

13. An apparatus according to claim 12 in which the utilization means is a sprayer which includes a boom and wherein said operation representing signals include sprayer speed over the ground, sprayer boom size, required active ingredient concentration, and spray liquid flow rate.

14. An apparatus according to claim 9 in which the apparatus is arranged so that the active ingredient liquid is contained until introduction into the carrier liquid.

15. An apparatus according to claim 9 in which said carrier liquid supply means includes a carrier liquid pump, said carrier liquid pump and displacement medium supply means pump being isolated from the active ingredient.

16. An apparatus according to claim 9 in which the active ingredient liquid is isolated from the displacement medium.

17. An apparatus according to claim 9 further including means to draw the active ingredient liquid into the container means by reversing the action of the displacement medium.

18. An apparatus according to claim 9 further including flushing means operable on the completion of displacement of active ingredient liquid to supply a flushing liquid to the container means and to the unrestricted flow path.

19. An apparatus according to claim 18 in which the flushing means includes a valve operable to bypass the liquid isolating means and to allow carrier liquid to flush the container means and the unrestricted flow path.

20. An apparatus according to claim 9 in which the liquid isolating means is one of a piston and a diaphragm.

* * * * *